(12) United States Patent
Revell

(10) Patent No.: US 10,230,391 B2
(45) Date of Patent: Mar. 12, 2019

(54) COMPRESSION AND/OR ENCRYPTION OF A FILE

(71) Applicant: KELICOMP AB, Stockholm (SE)

(72) Inventor: Elise Revell, Rånäs (SE)

(73) Assignee: KELICOMP AB, Stockholm (SE)

( * ) Notice: Subject to any disclaimer, the term of this patent is extended or adjusted under 35 U.S.C. 154(b) by 0 days.

(21) Appl. No.: 15/566,909

(22) PCT Filed: Apr. 18, 2016

(86) PCT No.: PCT/SE2016/050331
§ 371 (c)(1),
(2) Date: Oct. 16, 2017

(87) PCT Pub. No.: WO2016/167718
PCT Pub. Date: Oct. 20, 2016

(65) Prior Publication Data
US 2018/0131386 A1 May 10, 2018

(30) Foreign Application Priority Data

Apr. 17, 2015 (SE) ........................................ 1550463

(51) Int. Cl.
*H03M 7/00* (2006.01)
*H03M 7/34* (2006.01)
(Continued)

(52) U.S. Cl.
CPC .... *H03M 7/3082* (2013.01); *G06F 17/30129* (2013.01); *G06T 9/00* (2013.01);
(Continued)

(58) Field of Classification Search
CPC .... H03M 7/3082; H03M 7/4093; H03M 7/30; H03M 7/40; H04L 2209/34; G06F 1/30129; G06F 17/30
(Continued)

(56) References Cited

U.S. PATENT DOCUMENTS 4,281,391 A   7/1981  Huang
6,373,986 B1 *  4/2002  Fink ......................... G06T 9/00
                                                              382/232
(Continued)

FOREIGN PATENT DOCUMENTS

WO          0 949 589 A2   10/1999
WO       WO 01/50325 A2    7/2001
WO       WO 2016/085393 A1  6/2016

OTHER PUBLICATIONS

Anonymous: "RSA (cryptosystem)", Wikipedia, Apr. 3, 2015 (Apr. 3, 2015), XP055515766, Retrieved from the Internet: URL: https://en.wikipedia.org/w/index.php?title+RSA_(cryptosystem)&oldid=654752538 (retrieved on Oct. 16, 2018).

(Continued)

*Primary Examiner* — Jean B Jeanglaude
(74) *Attorney, Agent, or Firm* — Birch, Stewart, Kolasch & Birch, LLP

(57) ABSTRACT

A computing device includes a memory and a controller. The controller is configured to encrypt and/or compress a file by transforming at least a portion of said file to a number and transforming the number to an exponent vector comprising at least one exponent, wherein each exponent corresponds to a base in a base vector, whereby the file is represented by the exponent vector and a family constant. The family constant is configured to align the number to be compressed and/or encrypted into a table family number, and the table family number represents a number family which is evenly dividable with the number.

16 Claims, 8 Drawing Sheets

(51) Int. Cl.
   *H03M 7/30*   (2006.01)
   *G06T 9/00*   (2006.01)
   *H04L 9/00*   (2006.01)
   *H04N 19/90*  (2014.01)
   *H03M 7/40*   (2006.01)
   *G06F 17/30*  (2006.01)

(52) U.S. Cl.
   CPC ........... *H03M 7/30* (2013.01); *H03M 7/4087* (2013.01); *H03M 7/4093* (2013.01); *H04L 9/00* (2013.01); *H04N 19/90* (2014.11); *H04L 2209/34* (2013.01)

(58) Field of Classification Search
   USPC ..................................................... 341/50, 51
   See application file for complete search history.

(56) References Cited

U.S. PATENT DOCUMENTS

| | | | |
|---|---|---|---|
| 6,462,680 B1 | 10/2002 | Hayes | |
| 6,633,244 B2* | 10/2003 | Avery | ............... G06T 9/007 341/51 |
| 2009/0207934 A1 | 8/2009 | Ragot et al. | |

OTHER PUBLICATIONS

Anonymous: "Scientific notation", Wikipedia, Feb. 25, 2015 (Feb. 25, 2015), XP055515823, Retrieved from the Internet: URL: https://en.wikipedia.org/w/index.php?title=Scientifc_notation&oldid=648991452 (retrieved on Oct. 16, 2018).
Extended European Search Report issued in European Application No. 16780385.7 dated Oct. 29, 2018.
Lin Po-Han: "Base Encryption: Dynamic algorithms, Keys, and Symbol Set", Dec. 31, 2000 (Dec. 31, 2000), XP055515179; Retrieved from the Internet: URL:http://www.edepot.com/baseencryption.html (retrieved on Oct. 15, 2018).

* cited by examiner

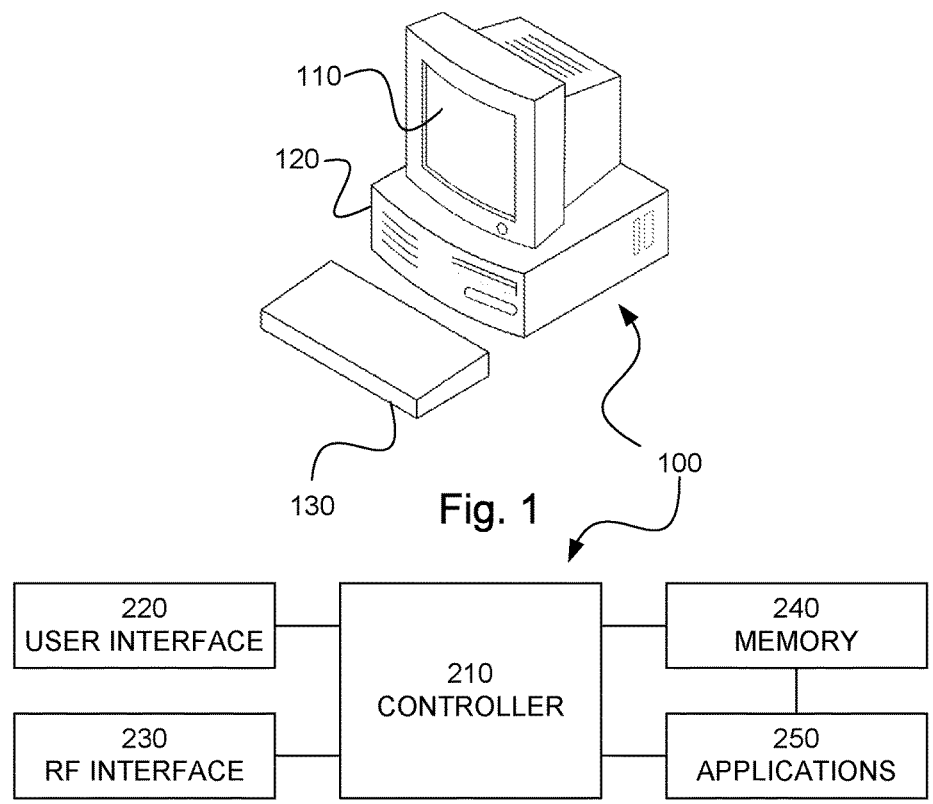
Fig. 1
Fig. 2
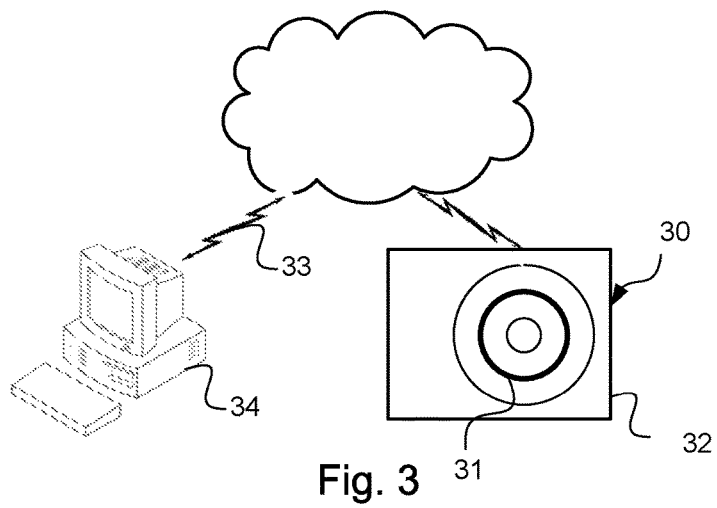
Fig. 3 exp = n; N; a; b; c; K

| n | N | a | b | c | K | base = A; B; C; D

| A | B | C | D |

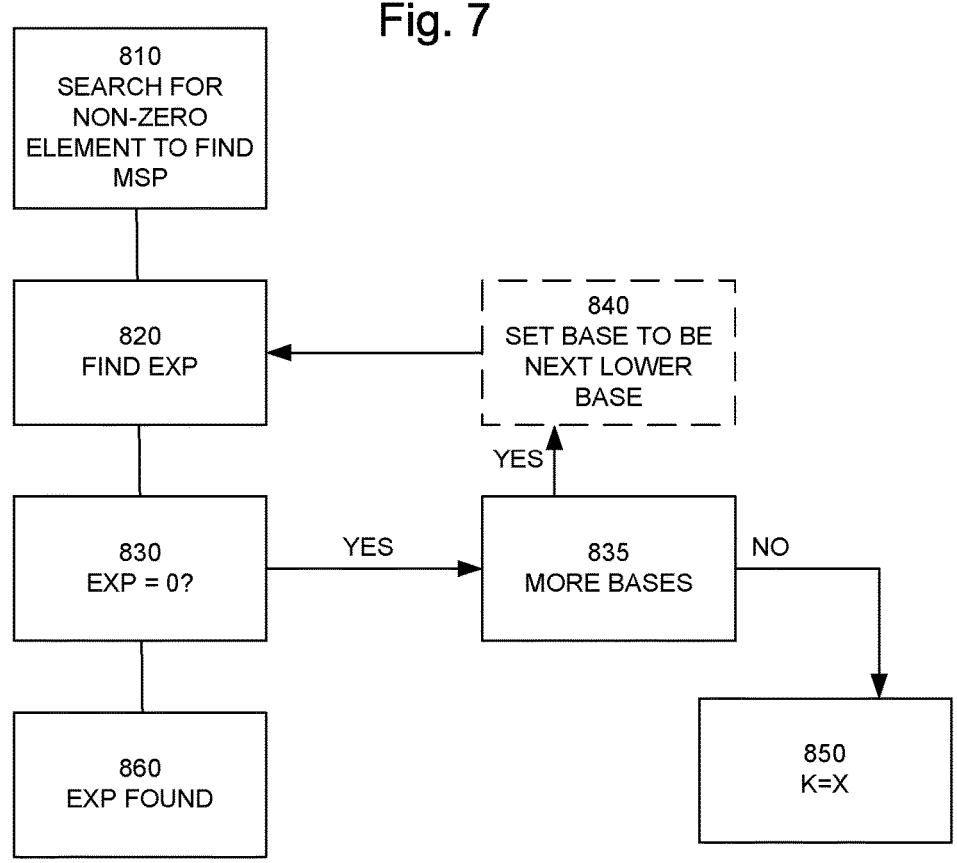

COMPRESSION AND/OR ENCRYPTION OF A FILE

TECHNICAL FIELD

This application relates to a system, a method, an apparatus and a computer-readable storage medium for improved compression and/or encryption of a file.

BACKGROUND

In the field of data and telecommunication the demand for send larger and larger amounts of data is ever increasing. The demand for streaming movies, music, games etc. steady increases as the communication channels increase their capacity of sending or transmitting data. Even if development over recent years has been fast and the capacity in the communication channels has doubled many times, there are still bottlenecks due to the large amount of data that is communicated. Users may for example experience that a movie is lagging when watching it on for example on a smart phone.

One way of dealing with the above described problem to enhance the communication between different network nodes is to compress data before it is sent. There are different ways to compress data; however the basic principle is to encode data sequences, i.e. any type information using fewer bits then the original representation of that data. Such compression may be done lossless, i.e. without loosing any information when decompressing the data. Lossless compression reduces bits by identifying and eliminating statistical redundancy to present data in a more concise way without losing any information. Lossless compression is possible because most data has statistical redundancy. For example, in a video there may be areas (pixels) in an image that do not change colour over several video frames. Instead of coding "green pixel, green pixel, . . . " for several video frames that are following each other, the data may be encoded as "green pixel in next 43 video frames". This is an example of run-length encoding, but there are many schemes to reduce file size by eliminating redundancy, such as the Lempel-Ziv (LZ) compression methods.

Another way is to use lossy compression, which reduces bits by identifying "unnecessary" information and removing it. The starting point with such a scheme is that some loss of information is acceptable. Dropping nonessential detail from the data source can save storage space. Lossy data compression schemes are informed by research on how people perceive the data in question. For example, the human eye is more sensitive to subtle variations in luminance than it is to variations in colour. One example of lossy compression is the well known JEPG image compression, which works in part by rounding off nonessential bits of information. There is always a trade-off between information lost and the size reduction.

The process of reducing the size of a data file is popularly referred to as data compression, even if there is a formal name, source coding, which means that coding is done at the source of the data before it is stored or sent. The benefit with compression is that it reduces the resources used for storing, transmitting and processing data. However, the compressed data must be decompressed to use which requires some additional computational or other costs when performing decompression. To make it worthwhile to compress data there should be a significant compression such that it is worth the extra computational complexity.

There have been made many attempts to compress data. The demand for more efficient ways to reduce data lossless is ever increasing as the public requires higher and higher quality of data that is streamed to their devices. It is no longer enough to see a movie on your smart phone; one wants to see a movie in High Definition, HD, quality.

Thus there is a need fore a more efficient method for enhancing communication between different network nodes by compressing data.

Furthermore, there exist a number of manners for encrypting data. These encryption techniques are under constant attack and it is therefore necessary to update such techniques and also to propose alternative solutions to stay ahead of malevolent users.

Accordingly, there is thus a need for an improved, possibly alternative, manner for compressing and/or encrypting a file.

SUMMARY

It is an object of the teachings of this application to overcome the problems listed above by providing a computing device, comprising a memory and a controller, wherein said controller is configured to encrypt and/or compress a file by transforming at least a portion of said file to a number and transforming the number to an exponent vector comprising at least one exponent, wherein each exponent corresponds to a base in a base vector, whereby the file is represented by the exponent vector and a family constant, wherein the family constant is configured to align the number to be compressed and/or encrypted into a table family number, and wherein the table family number represents a number family which is evenly dividable with the number.

It is also or alternatively an object of the teachings of this application to overcome the problems listed above by providing a computing device, comprising a memory and a controller, wherein said controller is configured generate a database to be used when compressing and/or encrypting a file by generating a number, determine the suitability of said number. If said number is found suitable, then store said number in the database and else if the number is found not suitable, then reject said number. The previous steps are repeated until the number is equal to or larger than a maximum value. The controller is configured to determine the suitability of the number by dividing it by a table family number, wherein the table family number represents a number family which is evenly dividable with the number, and wherein if a remaining sum is an integer the number is found suitable.

In one embodiment, the controller is further configured to: transform the portion of the file to an exponent vector and at least one constant, such as a family constant, and at least one scaling factor.

It is also an object of the teachings of this application to overcome the problems listed above by providing a method for encrypting and/or compressing a file by transforming at least a portion of said file to a number and transforming the number to an exponent vector comprising at least one exponent, wherein each exponent corresponds to a base in a base vector, whereby the file is represented by the exponent vector and a family constant, and possibly other constants and/or scaling factors.

It is also an object of the teachings of this application to overcome the problems listed above by providing a method for generating a database to be used when compressing, decompressing, encrypting and/or encrypting a file by generating a number, determine the suitability of said number. If said number is found suitable, then store said number in the database and else if the number is found not suitable, then reject said number. The previous steps are repeated until a maximum value is reached and the generation of the database is completed.

In one embodiment the controller is configured to determine the suitability of the number by dividing it by a table family number, wherein the table family number represents a number family which is evenly dividable with the number, and wherein if a remaining sum is an integer the number is found suitable.

It is an object of the teachings of this application to overcome the problems listed above by providing a computing device comprising a controller configured to decrypt and/or decompress a file, wherein at least one portion of the file is being represented by an exponent vector, by transforming the exponent vector to a number and transforming the number to said file.

It is also an object of the teachings of this application to overcome the problems listed above by providing a method for decrypting and/or decompressing a file wherein at least one portion of the file is being represented by an exponent vector by transforming the exponent vector to a number and transforming the number to said file.

It is also an object of the teachings of this application to overcome the problems listed above by providing a computer readable storage medium encoded with instructions that, when executed on a processor, performs any of the methods according to above.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail with reference to the accompanying drawings in which:

FIG. 1 is a schematic view of a terminal according to the teachings herein;

FIG. 2 is a schematic view of the components of a terminal according to the teachings herein;

FIG. 3 shows a schematic view of a computer-readable medium according to one embodiment of the teachings of this application;

FIG. 7 shows a representation of a number, where a most significant position is marked according to an embodiment of the teachings herein;

FIG. 8 shows a flowchart for a general method of how to determine the highest exponent by finding the most significant position according to an embodiment of the teachings herein;

DETAILED DESCRIPTION

Figures 4, 5A, 5B:
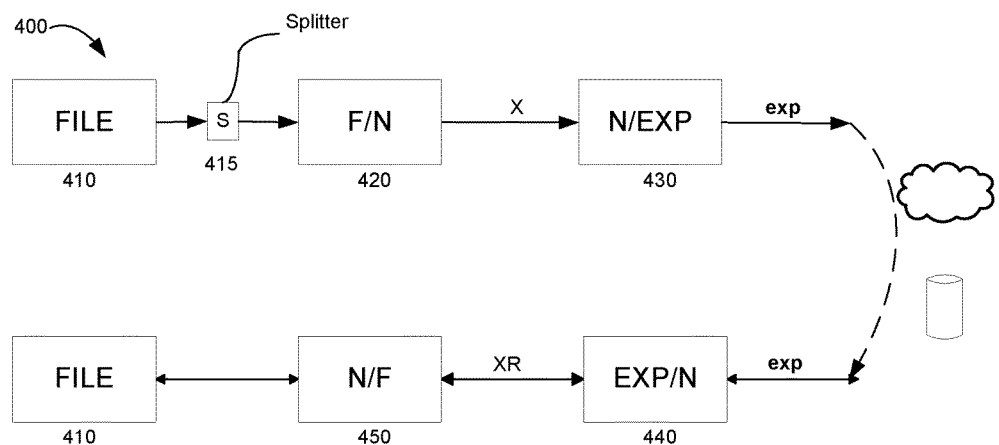
FIG. 4 shows an overview of a compression/decompression system 400 according to an embodiment of the teachings herein.
FIG. 5A shows a schematic view of a representation 500 of an exponent vector according to an embodiment of the teachings herein.
FIG. 5B shows a corresponding base vector according to an embodiment of the teachings herein.

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

FIG. 1 shows a computation device 100 according to an embodiment herein. In one embodiment the computation device 100 is configured for network communication, either wireless or wired. In one embodiment the computation device 100 is configured for network communication, both wireless and wired. Examples of such a computation device 100 are: a personal computer, desktop or laptop, an internet tablet, a mobile telephone, a smart phone, a personal digital assistant, a server, electronic key, machine-to-machine device (M2M) and a work station to name a few.

The computation device 100 will hereafter be exemplified and described as being a personal computer 100. The personal computer or terminal 100 comprises a display 110 and a housing 120. The housing comprises a controller or CPU (not shown) and one or more computer-readable storage mediums (not shown), such as storage units and internal memory. Examples of storage units are disk drives or hard drives. The terminal 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a terminal 100 to connect with other terminals or a server.

The terminal 100 further comprises at least one input unit such as a keyboard 130. Other examples of input units are computer mouse, touch pads, touch screens or joysticks to name a few.

FIG. 2 shows a schematic view of a general structure of a computing device. The computing device may be a computation device as in FIG. 1 or a server. In one embodiment the computing device is a computing apparatus as will be discussed in further detail below. In the description below the computing device will be disclosed as being a terminal according to FIG. 1. The terminal 100 comprises a controller 210 which is responsible for the overall operation of the terminal 100 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The computing device 100 comprises a memory 240 for storing computer files on. Computer files are well-known in the art and will be referred to simply as files herein. The controller 210 is configured to read instructions from the memory 240 and execute these instructions to control the operation of the terminal 100. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof.

The memory 240 is used for various purposes by the controller 210, one of them being for storing application data and program instructions 250 for various software modules in the terminal 100. The software modules include a real-time operating system, drivers for a man-machine interface 220, an application handler as well as various applications 250. The applications 250 can include a messaging application such as electronic mail, a browsing application, a banking application, as well as various other applications 250.

The terminal 100 may further comprise a user interface 220, which in the terminal 100 of figure of 1, is comprised of the display 110, the keypad 130. The display 110 may be a touch display upon which virtual keys (not shown) may be displayed and operated. Such virtual keys may replace any or all of the physical keys 130 and no difference will be made herein if not explicitly stated.

The user interface (UI) 220 also includes one or more hardware controllers, which together with the UI drivers cooperate with the display 110, keypad 130, as well as various other I/O devices such as sound system, LED indicator, etc. As is commonly known, the user may operate the terminal 100 through the man-machine interface thus formed.

The terminal 100 may further comprise a communication interface 230, which is adapted to allow the terminal to communicate with other devices. The communication interface may be a radio frequency interface adapted to communicate through the use of different radio frequency technologies. Examples of such technologies are WIFI, Bluetooth®, W-CDMA, GSM, UTRAN, LTE, and NMT to name a few.

The communication may also or alternatively be a wired interface 230, which is adapted to allow the terminal to communicate with other devices through the use of different network technologies. Examples of such technologies are USB, Ethernet, and Local Area Network, TCP/IP (Transport Control Protocol/Internet Protocol) to name a few.

The computing device 100 is thus configured to receive and/or transfer a file through the communication interface 230.

FIG. 3 shows a schematic view of a compruter-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used. In such an embodiment the data disc 30 is one type of a tangible computer-readable medium 30.

The instructions 31 may also be downloaded to a computer data reading device 34, such as a computer or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a non-tangible computer-readable medium 30.

The instructions may be stored in a memory (not shown explicitly in FIG. 3, but referenced 240 in FIG. 2) of the computer 34.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 4 shows an overview of a compression/decompression system 400 according to an embodiment of the teachings herein, comprising or to be executed within at least one computing device 100. The controller 210 of the computing device 100 is configured to receive a file 410. The file 410 may be received through the communication interface 230 or from the memory 240.

The controller 210 of the computing device 100 is configured to process the file 410 in order to compress it for improved storage or transmission of the compressed file 410. This has the technical advantage in that it saves storage space and/or bandwidth.

In one embodiment, the controller is configured to employ means for splitting or dividing 415 the file 410 into smaller portions and compress each portion individually. In the following, there will be made no difference between processing a portion or a complete file. In an embodiment where portions of the file are compressed individually, a corresponding controller will be configured to process the portions individually and concatenate or otherwise combine the file portions resulting from the decompression of the compressed portions. One benefit of splitting up into smaller portions is that the calculations are faster for each portion. Examples of file portions of 150 Bytes have resulted in a compression ratio of 4.7% for each portion, leading to an overall compression of 4.7% using only the bases {2,3,5,7}.

The controller 210 is configured to compress the file 410 (or portions of it) by employing means 420 for transforming the file 410 into a number X. In one embodiment the controller is configured to transform the file 410 into a decimal number, i.e. a number having the base 410. In one embodiment the controller is configured to transform the file 410 into a hexadecimal number, i.e. a number having the base 16. In one embodiment the controller is configured to transform the file 410 into a binary number, i.e. a number having the base 2. In such an embodiment, the actual conversion may be represented by simply transforming the file into a format that is better suited for performing mathematical operations on. In one such embodiment, the format transformed into is a string vector.

The controller 210 then employs means 430 for transforming number X into an exponent vector exp. The controller 210 is configured to transform the number X into the exponent vector exp by determining the exponents for a base vector base wherein the number X may be represented by each element of the base vector base, being raised to the power of the corresponding element of the exponent vector exp. By choosing the bases carefully, the number X may then be expressed in a much shorter form than if the number is expressed in its natural form.

A trivial example to illustrate, the file [10000000] corresponding to the decimal number 256 ($256_{10}$) may be expressed through the exponential 2 for the corresponding base 16. All that is needed to be transmitted or stored is thus $[20]=20_{16}$ and a compression ratio of 25% has already been achieved.

The controller 210 may then store or transmit the exponent vector for later retrieval by the same or another computing device. In the following a store will be represented by a transmission to the memory 240 and no difference will be made between storing in the memory 240 and a transmission through the communication interface 230.

The controller 210 of the same or another computing device is configured to receive an exponent vector exp, either from the memory 240 or through the communication interface 230 and to transform the exponent vector exp into a number by employing means 440 for transforming an exponent vector exp into a number. The controller 210 then employs means 450 for transforming the number $X_r$ into a file thereby decompressing the file 410. In an embodiment where a portion of the file 410 has been compressed, the controller is configured to decompress the portions and then concatenate or otherwise combine the resulting file portions into the complete file. Especially if exponent vectors exp corresponding to portions are received out of order, the controller 210 is configured to determine the order and combine the portions in the right order. The order may be indicated by a series or ordering number being part of the exponent vector exp for the number representing the portion.

The controller 210 is configured to retrieve the base vector base from the memory (or through the communication interface) and if both the controller compressing the file and the controller decompressing the file (which may be the same controller) has access to the same base vector base, the number may easily be reconstructed by simply raising the elements of the base vector base to the power of the elements of the exponent vector exp and combining the partial results.

FIG. 5A shows a schematic view of a representation 500 of an exponent vector exp. Each element of the exponent vector exp is represented by a (bit) field of the representation 500. In the example of FIG. 5A, the exponent vector exp includes an ordering number n, a scaling number N, exponents a, b, c etc and a constant K.

It should be noted that the ordering number n, the scaling number N and/or the constant K are optional. The essential elements of the exponent vector exp are the base exponents a, b, c and so on.

In one embodiment, the exponent vector exp, may also include multiple exponents for one or several bases. For example an exponent vector exp may be {n, N, $a_1$, $a_2$, b, $c_1$, $c_2$, K} for a base vector base including the bases {A, B, C}.

In one embodiment, the exponent vector exp may also include constants $c_1$ for each base in the base vector. These constants $c_i$ are scaling constants.

FIG. 5B shows a corresponding base vector base. In the example of FIG. 5B, the base vector includes the bases A, B, C etc.

A file number may be recreated by combining the bases in the base vector base raised to the exponents in the exponent vector exp by addition, multiplication or a combination thereof.

One general formula for recreating the number is:

$X=N*(A^a \oplus B^b \oplus C^c)+K$, where $\oplus$ represents a combining operation such as multiplication or addition. Other operations are also possible, as would be apparent to skilled reader. For example, one operation could be to raise a term or a base to the power of for example 2 possibly repeatedly. In such an embodiment, the exponents may be found through repeatedly finding a square root (or other root) of a term. Such roots may be found by calculations or through a look up in table storing possible values.

As has been mentioned above, each base may have more than one corresponding exponent. In such a case, a more general formula for the number X is:

$X=N*(\Sigma A^{ai} \oplus \Sigma B^{bi} \oplus \Sigma C^{ci})+K$, where ai is the exponent(s) for base A, bi is the exponent(s) for base B, and ci is the exponent(s) for base C. Alternatively, the base vector base may include duplicate bases, where by the first formula may be applied. The same also holds true for the formulas presented below.

To reduce the number of needed calculations, reduce the exponent sizes and to improve the resolution of the compression, a scaling factor may be used.

For an embodiment where each base-exponent pair is also scaled, the generalized formula becomes:

$X=N*(\Sigma c_i A^{ai} \oplus \Sigma c_i B^{bi} \oplus c_i C^{ci})$ K, where c are scaling factors.

Alternatively, the sum for each base is scaled (which corresponds to all scaling factors for the same base are the same, $c_i=c_j$) and the generalized formula becomes $X=N*(c_a \Sigma A^{ai} \oplus c_b \Sigma B^{bi} \oplus c_c \Sigma C^{ci})+K$, where $c_a$ is the scaling factor for base A.

For the scaling combinations the formula becomes: $X=N* (c_a \Sigma c_i A^{ai} \oplus c_b \Sigma c_i B^{bi} \oplus c_c \Sigma c_i C^{ci})+K$ It should also be noted that the formula could have recursive elements or repeated elements. We choose the notation below to illustrate this.

$X=N_t * \Sigma N_j * (c_a c_i A^{ai} \oplus c_b \Sigma c_i B^{bi} \oplus c_c \Sigma c_i C^{ci}) + K_j) K_t$ where Nj and Kj are the multiplier and constants for each repetition and Nt and Kt are the multiplier and the constant for the total formula. As has been noted above, all scaling factors, multipliers and/or constants as well as bases need not be explicitly part of the formula.

The constant K could be used to indicate that the number is odd and thereby reduce the processing to only reduce even numbers, which would then carry a bit to indicate whether it was actually odd or even before having been reduced (an odd number would then be subtracted with −1 before reduction and added with +1 when being reconstructed. The constant K could thus have more than one part, namely on part for indicating odd/even and one for indicating a possible remainder. Also, there could be one (set of) constant(s) for each repetition of the formula, as is indicated by the notation above.

The combining operation $\oplus$ may also be used to indicate a segmented or partial calculation, such as normally indicated by parenthesis. Of course, this could also be represented by some bases appearing multiple times. For example (constants, scaling factors and multipliers left out from this example, but it should be noted that they can also be included as is indicated by the notation above):

$A^a(B^b+C^c)$ could also be expressed as $A^a*B^b+A^a*C^c$

Should this be repeated in several steps the notation could be $\Sigma Aj^{aj}(Bj^{bj}+Cj^{cj})=A1^{a1}(B1^{b1}+C1^{c1})+A2^{a2}(B2^{b2}+C2^{c2})\ldots$ which could also be expressed as $\Sigma Aj^{aj}*Bj^{bj}+Aj^{aj}*Cj^{cj}=A1^{a1}B1^{b1}+A1^{a1}C1^{c1}+A2^{a2}B2^{b2}+A2^{a2}C2^{c2}\ldots$ It should be noted that even if the formulas above only have three bases, any number of bases is possible. The number of bases may be kept low, for example below 10 or below 5, to enable a higher compression ratio, as a low number of bases results in shorter exponent vectors.

To avoid negative constants, bases whose exponents are 0 may be ignored thus not contributing to the sum, when the bases are added together, i.e. when $\oplus=+$. Alternatively, the exponents may be stored as being one larger than determined and the base is then raised to the power of the exponent $-1$.

The bases selected for the base vectors depends on design issues and may be selected depending on the size of the files to be compressed, the rate of compression and the speed of the compression. For example, large bases give shorter exponent vectors and faster compression, but not such a good resolution necessitating large constants and possibly ordering number. Large bases also leads to shorter exponents. Lower bases provides for higher resolution, but possibly slower compression.

In one embodiment the bases are spaced apart to provide for resolution and a faster compression as the large bases reduces the number X faster.

Bases may grow exponentially $A=10(=10^1)$, $B=100(=10^2)$, $C=1000(=10^3)$ $A=10$, $B=100(=A^2)$, $C=10000(=B^2)$ or linearly $A=10$, $B=20$, $C=30$ $A=2$, $B=3$, $C=5$ If the bases are prime numbers, they avoid divisional loops to occur. Examples of such base vectors are: $\{2,3,5,7\}$ (linear) and $\{2,31,127,1027\}$ (exponential).

If one of the bases equals the base for the number format (e.g. the base is 2 for binary numbers, 10 for decimal numbers etc) and that base is combined through multiplication, it is easy to find an exponent, maybe not the highest, but at least a partial) by simply counting the number of trailing 0s in the representation, thereby avoiding divisional operations.

In one embodiment, the exponent for each base (or at least one base) may be accompanied by a scaling constant for that base. This enables for faster compression/reduction of the number X, especially for large numbers X (or large residuals of the number X as it is being reduced). For example, if the number 220 is to be reduced using the bases $A=10$, $B=100$, the number can be expressed as 2;1;2;1 or in binary 10;1; 10;1 or 101101 using the notation $X=c_aA^a+c_bB^b$ and $\exp=\{c_a;a;c_b;b\}$ being shorter than 11011100. Should the same number be expressed without scaling factors, i.e. using the notation $X=A^a+B^b+K$ and $\exp=\{a;b;K\}$, the number 220 would be expressed as $\{1;1;11011110\}$. Alternatively, a general scaling could be used, i.e. the notation $X=N(A^a+B^b)+K$ and $\exp=\{N;a;b;K\}$ which would result in $\{10;1;1\}$. As can be seen the use of scaling factors can greatly reduce the size of the exponent vector, or at least the elements of the exponent vector. The benefit f using scaling factors comes from the fact that using only exponents may lead to that an increase in an exponent may result in a change that is too great, whereas a simple scaling can reduce the number quickly and as the scaling factors are always smaller than the bases (or they would not be needed) they do not require much space and thus do not add much to the size of the exponent vector.

Using multiple exponents for the same base becomes beneficial when the number or residue for the number is far greater than the highest or next base. It is then possible to fit more than one base-exponent pair within the number for a given base.

Figure 6:
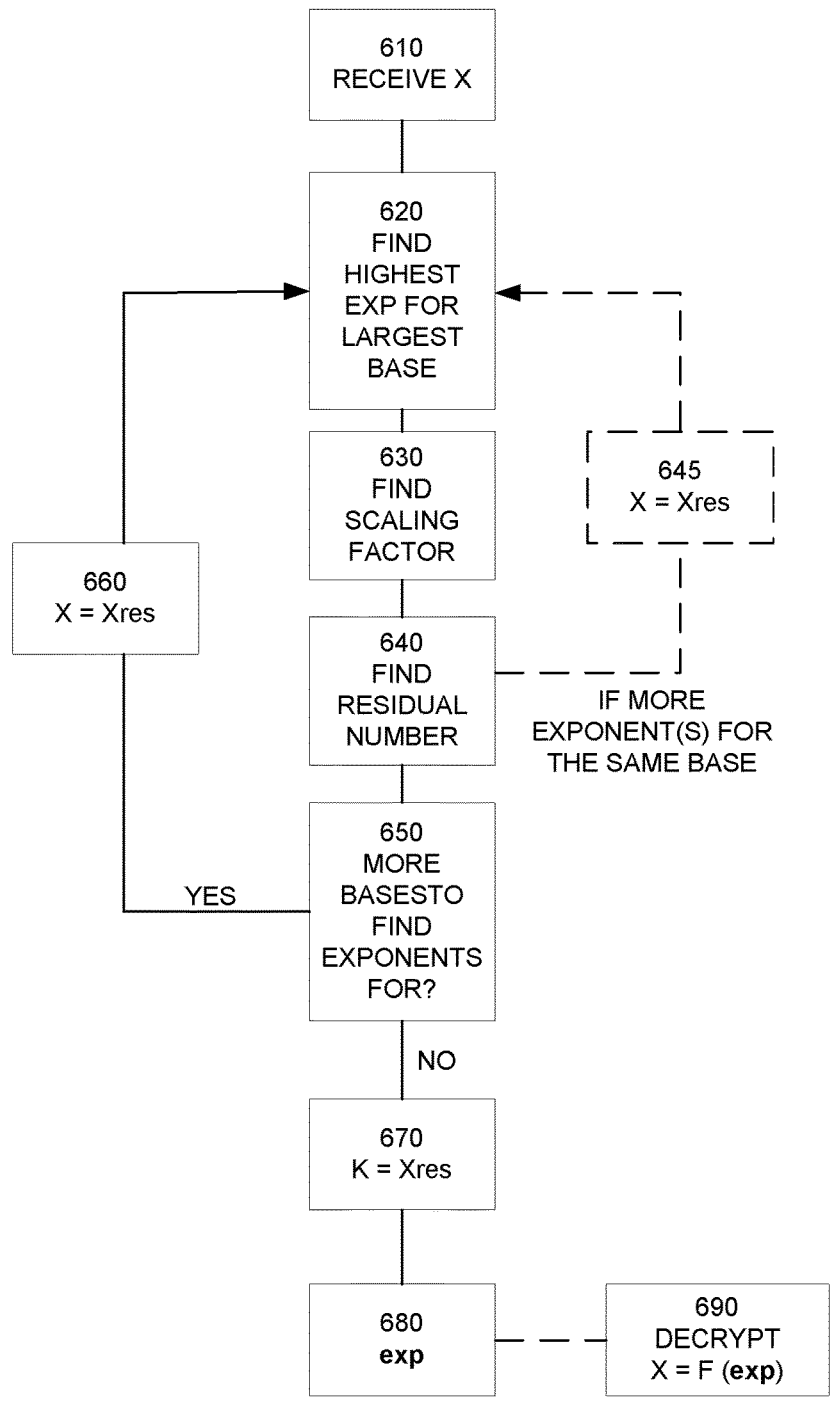
FIG. 6 shows a flowchart for a general method for reducing a number to an exponent vector based on a base vector according to an embodiment of the teachings herein.

FIG. 6 shows a flowchart for a general method for reducing a number to an exponent vector $\exp=\{c_a,a,c_b,b,c_d,d\}$ based on a base vector $base=\{A,B,\ldots,D\}$. The number may be the result of a transformed file (or partial file). It should be noted that the scaling factors are optional, individually or overall. Also note that the use of multiple exponents (and scaling factors) for at least one base is also possible and will be disclosed as an alternative, although not expressed in the notation used in the example of FIG. 6.

This reduction may be used for compressing a file, and/or it may be used for encrypting a file.

The method starts with receiving 610 the number X. Next an exponent for a base is found 620. In one example the (next) highest exponent is found. In one example the exponent is found for the (next) largest base. In one example, the highest exponent for the largest base is found. In the example notation of FIG. 6, the highest d for base D is found. The exponent d may be found by dividing the number X by the base D repeatedly. The exponent d may alternatively be found by a table lookup. The exponent d may alternatively be found by finding the most significant position (msp) for the number X. This alternative will be explained in detail with reference to FIGS. 7 and 8 below.

As the highest exponent d has been found, a scaling factor may be determined 630 (if such is used) by dividing the number X with the highest base D raised to the power of d and truncating the result. In the notation used $c_d=\text{Trunc}(X/D^d)$.

Thereafter a residual number $X_{res}$ is found 640 by subtracting the base raised to the power of the exponent multiplied by the scaling factor from the number, i.e. $X_{res}=X-c_dD^d$. Or in datalogical notation $X_{res}=\text{Modula}(X/D^d)$. In an embodiment where the bases are to be combined through multiplication, the residual number is determined through a division. In both cases, the residual number is determined by reducing the number by the base raised to the power of the exponent.

Optionally, if more than one exponent is to be found for the base currently being processed, the method returns to finding the highest exponent for the base, using the residual number $X_{res}$ as the number X, ie 645 set $X=X_{res}$.

Thereafter it is determined 650 if there are more bases in the base vector base to find exponents for. If so, then proceed reducing the residual number with the next lower base, that is 660 set $X=X_{res}$ and $base=base_{k-1}$, where k is the index of the current base assuming that the base vector is ordered in rising order. This provides the (other) exponents c, b, a . . . in the exponent vector exp. If there are no more bases, then the residual number is the rest or constant K 670, i.e. set $K=X_{res}$ and the exponent vector exp is completed 680 and may be stored or transmitted for later retrieval to be decompressed (or decrypted) back into the number X.

To decompress or decrypt 690 the exponent vector to the number X, simply insert the exponent vector exp in the formula used for the compression. The formula can be any variety of the formulas given in the above.

As disclosed in the above, the highest exponent for a base may be found by finding the most significant position for the number X. FIG. 7 shows a representation of a number X, where the most significant position msp is marked. For a binary number X, the most significant position is the most significant 1-bit. In the example of FIG. 7, a number X=109 is shown in 8 bits, where the msp is position 6. In the example of FIG. 7 the numbering for the most significant position goes from lowest position to the highest, but it should be noted that the numbering itself may not be important. In one embodiment it is only used for a table lookup. In one embodiment it is however, used for determining the exponent by calculating it based on the msp.

FIG. 8 shows a flowchart for a general method of how to determine the highest exponent by finding the most significant position.

To find the msp, the controller of the computing device may simply search 810 a representation of the number X to find the first non-zero element. As the number X is not any number, but represents a (portion of a) file, the likelihood that it will be all zeros or starting with many zeros is highly unlikely, and the search for the msp will therefore be rather quick requiring only a few comparisons.

Thereafter, the highest exponent is found 820. The exponent may be found through a table lookup. An example of such a table is shown below for the example of FIG. 7, for a binary number X and a base 7.

| msp | Exp |
| --- | --- |
| 0 | 2 |
| 1 | 2 |
| 2 | 1 |
| 3 | 1 |
| 4 | 1 |
| 5 | 0 |
| 6 | 0 |
| 7 | 0 |

The highest exponent may alternatively be found by calculating it based on the current base of the base vector base, the base for the number X and the msp.

For the base B, the exponent e and the number base D, the highest exponent may be determined as $$e = \mathrm{Trunc}(\sqrt[B]{D^{msp}}).$$

Alternatively, the exponent e may be determined in a faster manner as the base to use for the reduction (i.e. the element(s) of the base vector base) is known and the base for the number representation is also known, whereby the number base D root of the base B may be predetermined. The exponent e may then be determined as $$e = \mathrm{Trunc}(msp \sqrt[D]{B}), \text{ where } \sqrt[D]{B}$$

may be predetermined for faster calculations.

If it is found 830 that the exponent is 0, the next lower base is selected and the exponent is determined based on the lower base, either by a table lookup or a calculation as above. For large numbers, ie large files the exponent-msp table may thus be shorted accordingly by excluding all elements where the exponent is zero. The example table for FIG. 7 then becomes

| msp | Exp |
| --- | --- |
| 0 | 2 |
| 1 | 2 |
| 2 | 1 |
| 3 | 1 |
| 4 | 1 |

Alternatively, the table may include both the exponent, but also the corresponding base. In such a case, the determination whether the exponent is zero results in that the constant K is the number which is the same case as when there are no more lower bases. In the example of FIGS. 7 and 8, it has been assumed that only one exponent is determined for each base, but the same methodology may be used for multiple exponents for one or more bases. To generalize, using multiple exponents may be regarded as having a base vector with duplicate bases. This holds true also for the disclosure given above and with reference to FIG. 6.

For FIG. 8, the determination 830 whether the exponent is zero is thus followed by a determination 835 if there are more bases or not. If there are more bases, then the method proceeds with the next base. If there are no more bases, the constant K is set to equal 850 the number X and the exponent series is finished.

If the exponent is determined to not be 0, the exponent has been found and the method proceeds as in FIG. 6 after having found 620 the exponent.

If the base is evenly dividable with the number base, then the base raised to the power of the exponent ($D^d$) may be calculated through a series of shifts and no time consuming multiplication actions are necessary.

It has thus been disclosed in the above how a file may be compressed by transforming it into a number (or series of partial numbers each corresponding to a file portion) and reducing the number into an exponent vector exp using a formula and a vector of bases base. The file may then be represented solely by the exponent vector for storing or transmission. To alter decompress the file, all is needed is knowledge about the bases in the base vector and knowledge about any scaling factors and how they should be applied.

It should be apparent that as it is impossible to decompress the file without knowing the bases, the order of the exponents, whether scaling factors should be applied or not etc. it is possible to also encrypt the file using the method herein.

The teachings herein thus propose a manner of encrypting a file. The encryption is performed in the same manner as has been disclosed above in relation to compressing a file.

To make the encryption yet safer or more difficult to crack, at least one of the bases in the base vector base, may be selected to be a high prime number. By keeping the prime number secret, it thus becomes incredibly difficult to decrypt the file for a malicious user.

Furthermore, by keeping the order and types of the combining operands secret, it will also become incredibly difficult to decrypt the file for a malicious user.

For an implementation based on determining roots, the order of the root (square for example) may be kept secret.

In one embodiment, the block size, that the file is divided into before being transformed into a number (the block corresponding to the portion of the file to be transformed), may also be kept secret.

Combing these aspects (all or partially), provides for an encryption manner that is indeed difficult to crack.

For encryption purposes, the bases need not be selected so that they result in a compression. Some bases may even result in a longer presentation of the file, but in an encrypted version.

Likewise, for encrypting data, time constraints are also of less importance.

As is known, open encryption schemes are favored by the industry in where the formulas used for the encryption is publically disclosed. This would also be beneficial for the compression scheme presented herein as it would lead to a more wide spread use. However, by simply agreeing in secret with another party of the order in which to transmit the elements of the exponent vector, the file may be encrypted as well as being compressed. Especially for large files where the file would be split up into smaller portions, it would be nearly impossible to decipher whether a reordered combination of exponents have resulted in a correct decompression as the result would only give a portion of the whole file thereby making it difficult to check the correctness of the decompression.

One benefit of splitting up into smaller portions is that the calculations are faster for each portion. Examples of file portions of 150 Bytes have resulted in a compression ratio of 4.7% for each portion, leading to an overall compression of 4.7% using only the base vector {N,2,3,5,7,K}.

To speed up the calculations to be performed according to the disclosure above, a look up table may be generated holding all possible exponents for all (or most) numbers representing the file, or at least numbers representing a portion of the file.

Such a table may be generated once for each file (and reused for each portion) or it may be generated as a general lookup table.

The table may be generated beforehand and distributed along with the software instructions for implementing the teachings herein. Or it may be generated upon installation of such software instructions. As would be apparent to a skilled reader, the timing of the generation of the lookup table is not at the heart of the teachings herein and many variations exist.

The lookup table may also be used when decompressing and/or decrypting the exponent vectors, as an alternative to putting the exponent vectors through the corresponding formula.

Figure 9:
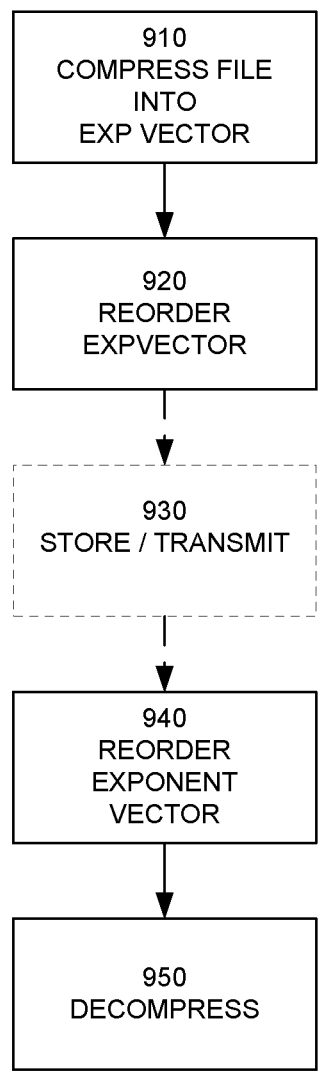
FIG. 9 shows a flowchart for a method for encrypting and decrypting a file according to an embodiment of the teachings herein.

FIG. 9 shows a flowchart for a method for encrypting and decrypting a file according to the teachings herein. A file is compressed 910 as in the above resulting in an exponent vector exp.

The exponential vector exp is reordered 920 thereby effectively encrypting the compression and thereafter stored or transmitted 930.

Alternatively, the exponential vector is not reordered. In such an embodiment, the bases and their order are kept secret.

Before decompressing 950 the file, the exponent vector exp may be reordered again 940 to fit the formula to be used, either be actually reordering the exponent vector exp or by applying a corresponding formula.

It should be noted that even though the disclosure herein has been given to reordering the exponent vector, the same teaching may be applied to reordering the base vector base, i.e. using a different formula either by the compressor or the decompressor, which in effect corresponds to a reordering of the exponent vector.

It should be noted that the encryption takes place regardless whether the exponential and/or the base vector is kept secret and/or maintained with regards to order as the compression itself also serves to encrypt the corresponding file.

In one embodiment, especially one where a file has been split into several portions, the base vector base may also be transmitted or stored. Then a general formula may be used to decompress the file, by assuming a format of the exponent vector exp and the base vector base, so that the exponents may be paired with a corresponding base. One example of such a general format is that each element of the exponent vector exp corresponds to a base in the base vector base in the same order. Another example is that each element pair in the exponent vector exp constitutes a scaling factor and an exponent corresponding to a base in the base vector base in the same order.

In such an embodiment, the base vector as well as the exponent vector may be reordered to provide even more possible encryptions. Also, the exponent vector (and possibly the base vector) may be reordered differently for each file portion. The reordering may be based on a formula or according to a table. For an example file of 1 MB, a file portion of 150 Bytes (corresponding to a 400 digit decimal number) and a base vector having four bases and using scaling factors we have 4!*8!=967680 possibilities for each file portion resulting in 967680*6991 [=1 MB/150 Bytes] =6,765,050,880 possibilities. Combined with transmitting the file portions in a jumbled order the number of possibilities becomes even greater.

To decrypt the file, the exponent vector may either be reordered back to its original ordering or the decryption may be based on a reordered base vector. Alternatively or additionally, the order and/or the bases are kept secret.

In an embodiment where the base vector base is stored or transmitted as part of the compressed file, the bases may be dynamically selected based on the msp. For example if there are many leading zeros (low msp), smaller bases are chosen, while if the msp is high, a higher base is chosen. This results in a somewhat lower, but faster compression and with an adapted resolution.

It should be noted that in order to speed up the calculations for the formulas a table can be generated and then used for all blocks of the file, or also all files, that are to be compressed and/or encrypted. The look up table may be generated holding all possible exponents for all (or most) numbers representing the file, or at least numbers representing a portion of the file.

Generating such a table would comprise generating exponent vectors and constants for all possible numbers X and storing them in the table. The incoming file to be compressed and/or encrypted would then be split up into blocks which in turn would be transformed into a number X. The number would then be used to query the table to find the exponent vector. Possibly the number X could be modified so that it is dividable by some number (for example 6), referred to as a number family, and then only the corresponding values being dividable with that number family need be stored. The exponent vector would then be accompanied by a constant F, possibly part of the constant K to properly identify the compressed and/or encrypted number X, where the number X would equal the result of the exponent vector being applied to the base vector through the use of the used formula, added to the constant F. The constant F, also referred to as a family constant F, aligns the number to be compressed and/or encrypted into the number family (in this example a 6-family).

Furthermore, to save space for storing the table, the entries stored could be divided by the number family (6 in this example). The family constant F may be used to align the number X to be compressed and/or encrypted, as will be described later on.

In one embodiment the file to be compressed and/or encrypted and later decompressed and/or decrypted is divided or split into smaller portions, which then are processed individually. For example, a file may be divided into portions of 1024 Bytes. Smaller or larger portions are also possible, as would be apparent to the skilled reader. In the following example, the embodiments will focus on processing a file divided into a plurality of portions, with the description focusing on processing one such portion.

Figure 10:
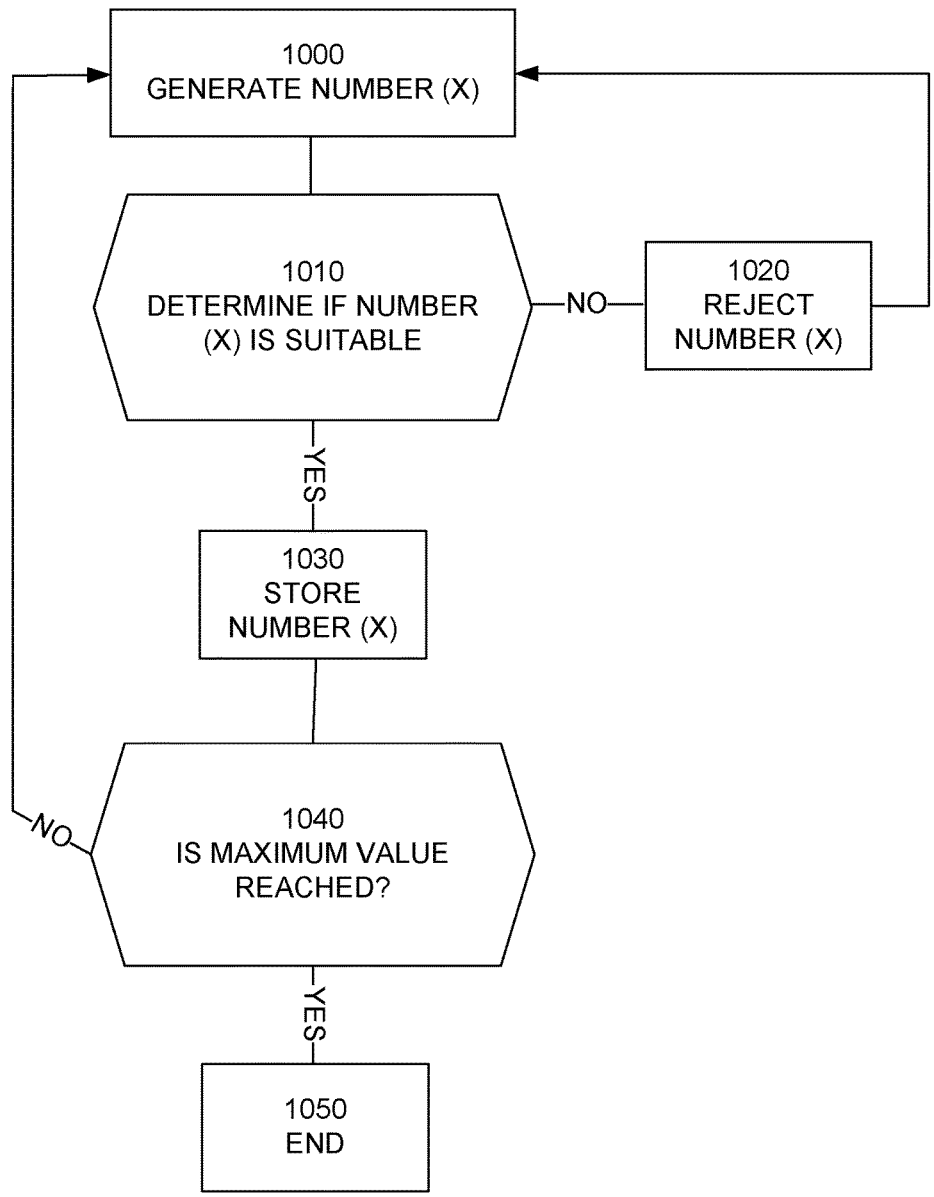
FIG. 10 shows a flowchart for a method for generating a database to be used when compressing and/or decompressing a file according to an embodiment of the teachings herein.

In one embodiment, as shown in FIG. 10, a database comprising a lookup table is generated in order to speed up the calculations. The table can then be used for all the portions of the file that are compressed and/or decompressed.

The first step is to generate a large amount of numbers X, corresponding to numbers that file portions are later transformed into. The number X is generated by using the general formula:

$X = N*(A^{a1} \oplus A^{a2} \oplus B^b \oplus C^c \oplus D^d)$ C where $\oplus$ represents a combining operation such as multiplication or addition. The exponent vector exp includes a scaling number N, exponents $a_1$, $a_2$, b, c, d and a constant C. Furthermore, the base vector includes the bases A, B, C and D. In one example the bases are defined as A=2, B=3, C=5, and D=7 and 0 represents addition, wherein the formula becomes $X = N*(2^{a1} + 2^{a2} + 3^b + 5^c + 7^d) + C$; the base vector: {2,3,5,7} and the exponent vector: {a1, a2, b,c,d,N,C} the constants C and N being part of (or stored/transmitted along with) the exponent vector even though not being exponents.

The formula for generating X is looped for all possible values for $a_1$, $a_2$, b, c and d until a maximum value is reached. The maximum value is reached when the number X is larger than or equal to the maximum value. If the maximum value is reached 1040 the generation of X is stopped. The maximum value for the different values N, $a_1$, $a_2$, b, c, d and C may for example be defined as:

N: [1; 6]

$a_1$: [0; x] where x is the lowest integer that provides a $2^x$ larger than or equal to the maximum represented value of a block size $a_2$: [0; x] where x is the lowest integer that provides a2' larger than or equal to the maximum represented value of a block size b: [0; y] where y is the lowest integer that provides a $3^y$ larger than or equal to the maximum represented value of a block size c: [0; z] where z is the lowest integer that provides a $5^z$ larger than or equal to the maximum represented value of a block size d: [0; q] where q is the lowest integer that provides a $7^q$ larger than or equal to the maximum represented value of a block size

C:[−1; 6]

where x, y, z and q are variables. The maximum represented value is set as the largest possible value that can be represented by the block size: For example if the block size is 1024 bytes, then $2^{8192} - 1$ is the maximum value for $A_1$ and $A_2$, e.g. where x=8191. The same or similar may be applied to the other variables.

Once a number X is generated its suitability 1010 of being comprised in the database is evaluated. The suitability of a number may be evaluated in several ways and the following is merely an example. The generated table may be associated with a table family number $F_t$ which represents what kind of numbers that is suitable for storing. For example, if the number X is dividable by the table family number $F_t$, then only the corresponding values being dividable with that number family need be stored. The table family number Ft thus represents a number family which is evenly dividable with the number X. The following is an example where the table family number $F_t$ is set to 6.

In order to determine the suitability of the number X, the number X is compared to the table family number Ft, by checking if it is evenly dividable by the table family number Ft. For example, the number X divided by 6. If a remainder, or remaining sum, is zero, the number X (as the number before the suitability evaluation) is stored 1030 in the database. In the case a remainder is not zero, the number X is rejected 1020 from the database. In other, more general terms, if Modula (X;F)=0, X is suitable.

Once a number X is found suitable, the number X that is to be stored in the table is divided by the table family number $F_t$ in order to save space. In this example the table family number $F_t$ is 6, and thus all stored numbers X may be divided by 6 in order to save space.

Figure 11:
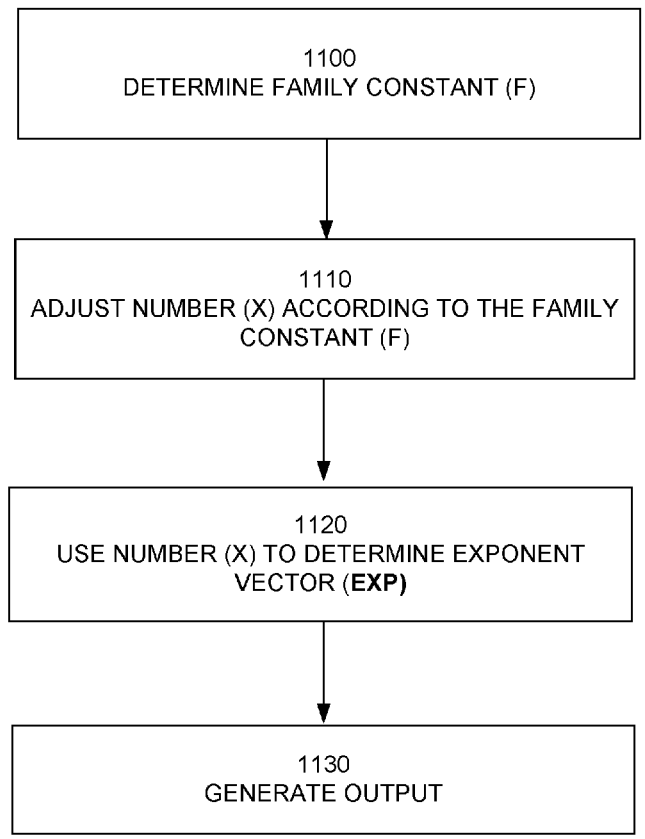
FIG. 11 shows a flowchart for a method for compressing a file according to an embodiment of the teachings herein.

In order to compress and/or encrypt a file, the file may be divided into several portions. The portions are then individually transformed into a number X. The next step is to transform the number X into an exponent vector exp. One example of this is shown in FIG. 11. The exponent vector exp is accompanied by a constant F which is possibly part of the constant K in the general formula above, wherein K represents C and F, to properly identify the compressed number X. The constant F, also referred to as a family constant F, is configured to align the number X to be compressed and/or encrypted into the table family number Ft (in this example a 6-family).

Once the number X is received, the family constant F is determined 1100 using the number X. The family constant F is found by reducing the number X by a variable $F_t$ and then dividing the remaining sum by a number, preferably the table family number $F_t$ which in this example is 6. This process is repeated for different values of the variable $F_1$ until the remaining sum is zero. When the remaining sum is zero ("0"), the value of the variable $F_t$ used to generate the result is set as the family constant F. In general terms, this could be described by the general formula: find $F_i$ such that mod(X−Fi; Ft)=0. This Fi equals the number family F; F=Fi, where $F_i$ ranges in a given interval. In one embodiment $F_i$ ranges between 2 and 7. In one embodiment $F_i$ ranges between 0 and 5. In one embodiment where Ft=6, the formula becomes: find Fi such that: mod(X−Fi,6)=0. This Fi equals the number family F; F=Fi.

When the family constant F has been determined, the next step 1110 is to adjust the number X by reducing the number X by the family constant F. This may be done by division, subtraction or any other reduction suitable. In one example the number X is reduced by subtracting the family constant F from the number X, i.e. X=X−F. This step aligns the number X to be compressed and/or encrypted into the number family allowing a more efficient compression and/or encryption.

In the next step, the number X is transformed 1120 into the exponent vector exp. This is done by querying the lookup table where the number X is used to query the table to find the exponent vector exp. The exponent vector includes the constant C and the scaling factor N, which also is a constant.

As some numbers being generated may correspond to negative numbers, a flag indicating if the sign is negative or positive may be used. This flag is referenced S hereinafter. If X<0, then X=|X| and S=1.

After the determination of exponent vector exp the output is generated 1130. The output from one portion of the file has the form of {exp, F}, i.e. the exponent vector exp and the family constant F. In one embodiment, the scaling factor N and the constant C may also be part of the output, if not already part of the exponent vector: {N, exp, C, F}. The sign flag S may also be part of the output. The output for the whole file, i.e. all the portions concatenated, consists of the exponent vector exp, the family constant F, the scaling factor and the constant C the sign S for each portion followed by the file type. The output may be expressed as {SUM (exp, F, N, C, S), file format}. The sign S may be positive or negative. The file format is represented by the filename extension, which is a suffix separated from the base filename by a dot or space. Common filename extensions are for example TXT, jpeg, png, tif and GFX, however it should be noted that any kind of file could be used.

Figure 12:
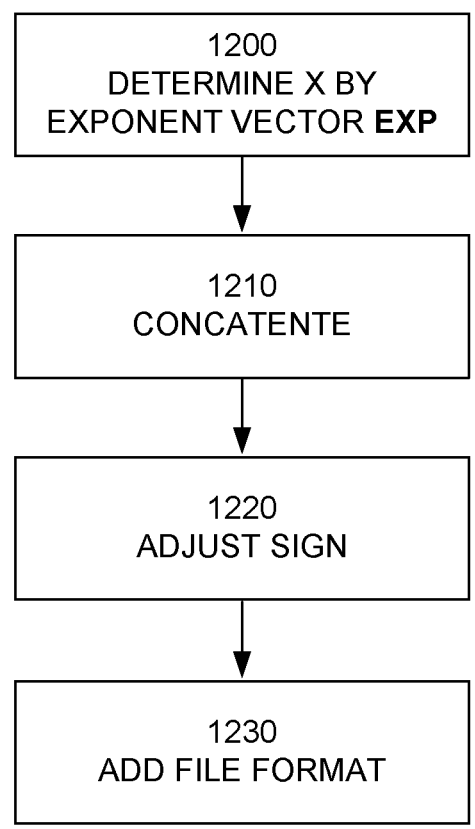
FIG. 12 shows a flowchart for a method for decompressing a file according to an embodiment of the teachings herein.

An embodiment showing a schematic view for a method decompressing a file is shown in FIG. 12. The first step is to transform the exponent vector exp including corresponding constants (N, C, S) to a number X, i.e. determine 1200 the number X using the exponent vector exp. This is repeated for all numbers of X, i.e. for each file portion. The determination can be made either by a table lock up or by using the exponent vector exp (and constants) in one general formula, as has already been described, for recreating the number: $X=N_i*(A^{a1} \oplus A^{a2} \oplus B^b \oplus C^c \oplus D^d)+C_i+F$, where $\oplus$ represents a combining operation such as multiplication or addition. In one embodiment, it is addition. The exponent vector exp may be regarded as including a scaling number N, exponents $a_1, a_2, b, c, d$ and a constant C. Furthermore, the base vector includes the bases A, B, C and D. Hence, for this example the exponent vector exp is $\{N_i, a_1, a_2, b, c, d, C_n, F$ and possibly S$\}$ for a base vector base including the bases {A, B, C, D}. In one example the bases are defined as A=2, B=3, C=5, and D=7. The scaling number $N_i$ is defined in the interval where I=1 to 6 and the constant C is defined in the interval where n=-1 to 6. The equation is thus stepped through for the different values for the variable exponents and the variable constants as provided for each file portion being represented by a number corresponding to the exponent vector.

When all the numbers X of the file portions are determined the next step is to transform the numbers X into a file. This is done by concatenating 1210 or otherwise combining the file portions into one single file to be decompressed and/or decrypted. Once the portions are combined into a file, the sign S of the output vector is adjusted 1220. The sign may either be positive or negative. The final step is to add 1230 the file format to the output vector. The numbers X are now transformed into the file and the file is thus successfully decompressed and/or decrypted.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for encrypting and/or compressing a file by transforming at least a portion of said file to a number and transforming the number to an exponent vector comprising at least one exponent, wherein each exponent corresponds to a base in a base vector, whereby the file is represented by the exponent vector and a family constant, wherein the family constant is configured to align the number to be compressed and/or encrypted into a table family number, and wherein the table family number represents a number family which is evenly dividable with the number, wherein said family constant is determined by reducing the number by a variable $F_i$ and then dividing the remaining sum by the table family member, and wherein this process is repeated for different values of the variable $F_i$ until the remaining sum is zero, wherein said variable $F_i$ that is used to generate the result is set as the family constant.

2. The method according to claim 1, wherein the number is transformed to an exponent vector by:

determining the family constant;

adjusting said number according to said family constant;

using said number to determine the exponent vector;

generating a representation comprising said exponent vector and said family constant.

3. The method according to claim 2, wherein said family constant is determined by reducing the number by a constant $F_i$ and then dividing the remaining sum by 6, wherein this process is repeated for different values of the variable $F_i$ until the result is an integer, wherein said variable $F_i$ that is used to generate an integer is set to the family constant.

4. The method according to claim 2, wherein the number is adjusted by reducing said number by the family constant.

5. A method for decrypting and/or decompressing a file that has been compressed according to claim 1, wherein at least one portion of said file is being represented by an exponent vector by transforming the exponent vector to a number and transforming the number to said file.

6. A non-transitory computer readable storage medium encoded with instructions that, when executed by a computer processor, cause it to perform the method according to claim 1.

7. A method for generating a database to be used when compressing and/or encrypting a file by generating a number;

determine the suitability of said number;

if said number is found suitable, then store said number in the database; and else if the number is found not suitable, then reject said number;

wherein the previous steps are repeated until the number is equal to or larger than a maximum value and wherein said controller is configured to determine the suitability of the number by dividing it by a table family number, wherein the table family number represents a number family which is evenly dividable with the number, wherein if a remaining sum is an integer the number is found suitable, wherein said family constant is determined by reducing the number by a variable $F_i$ and then dividing the remaining sum by the table family number, wherein this process is repeated for different values of the variable $F_i$ until the remaining sum is zero, and wherein said variable $F_i$ that is used to generate the result is set as the family constant.

8. The method according to claim 7, wherein a number is generated by using the formula $X=N*(2^{a1}+2^{a2}+3^b+5^c+7^d)+C$.

9. A method for decrypting and/or decompressing a file, wherein at least one portion of the file is being represented by an exponent vector and a family constant, by transforming the exponent vector to a number and transforming the number to said file, wherein the family constant is configured to align the number into a table family number, and wherein the table family number represents a number family which is evenly dividable with the number, wherein said family constant is determined by reducing the number by a variable $F_i$ and then dividing the remaining sum by the table family number, wherein this process is repeated for different values of the variable $F_i$ until the remaining sum is zero, and wherein said variable $F_i$ that is used to generate the result is set as the family constant.

10. The method according to claim 9, wherein the exponent vector is transformed to the number by using the formula $X=N*(A^a+B^b+C^c+D^d)+C_{constant}+F$, where the exponent vector is $\{N, a, b, c, d, C_{constant}, F\}$ for a base vector including the bases $\{A, B, C, D\}$, wherein the bases are defined as A=2, B=3, C=5, and D=7.

11. The method according to claim 9, wherein the number is transformed to the file by:
combining the numbers of at least one portion of said file;
adjusting a sign flag (S) of said number; and
adding the file format of said file to be decompressed.

12. The method according to claim 11, wherein the sign flag (S) of said number is adjusted by indicating if the sign is negative or positive.

13. A non-transitory computer readable storage medium encoded with instructions that, when executed by a computer processor, cause it to perform the method according to claim 9.

14. A method for generating a database to be used when compressing and/or decrypting a file by generating a number;
determining the suitability of said number;
  if said number is found suitable, then store said number in the database; and else
  if the number is found not suitable, then reject said number;
wherein the previous steps are repeated until a maximum value is reached and the generation of the database is completed and wherein said controller is configured to determine the suitability of the number by dividing it by a table family number, wherein the table family number represents a number family which is evenly dividable with the number, and wherein if a remaining sum is an integer the number is found suitable, wherein said family constant is determined by reducing the number by a variable $F_i$ and then dividing the remaining sum by the table family number, wherein this process is repeated for different values of the variable $F_i$ until the remaining sum is zero, and wherein said variable $F_i$ that is used to generate the result is set as the family constant.

15. A method for decrypting and/or decompressing a file that has been compressed according to claim 14, wherein at least one portion of said file is being represented by an exponent vector by transforming the exponent vector to a number and transforming the number to said file.

16. The method of claim 14 further comprising:
using the database to compress, decompress, encrypt or decrypt the file.

* * * * *